Oct. 27, 1970
J. JAFFE
3,536,604
HYDROCARBON CONVERSION PROCESS
Filed Sept. 6, 1968
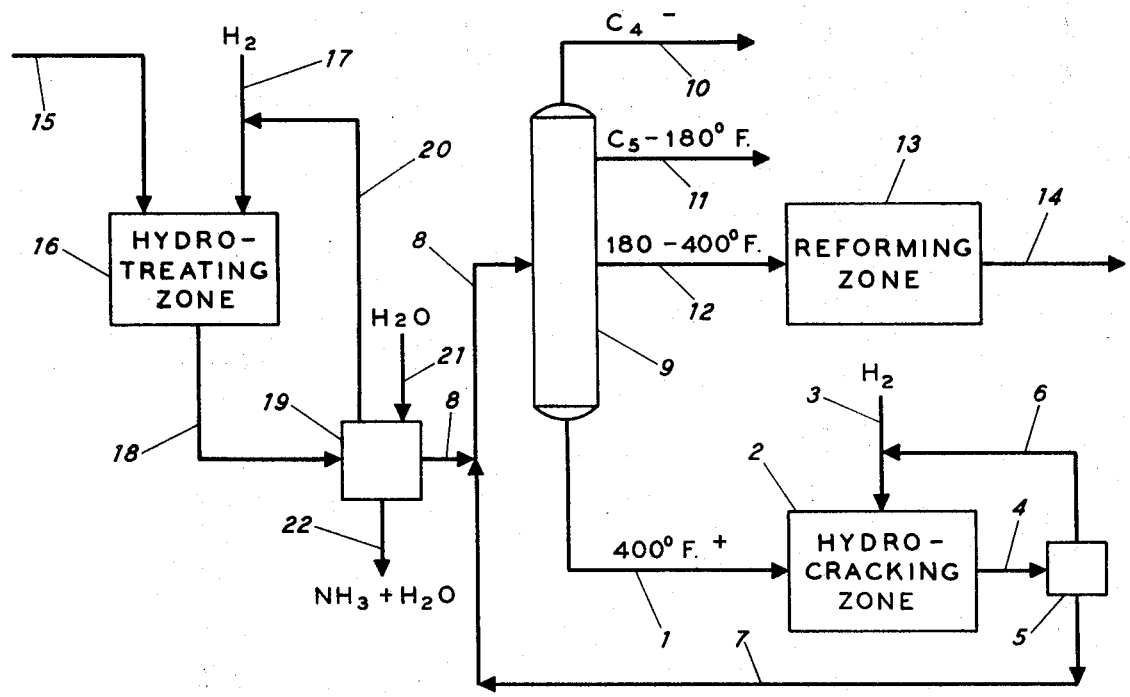
INVENTOR
JOSEPH JAFFE
BY R. H. Davies
ATTORNEY United States Patent Office 3,536,604
Patented Oct. 27, 1970

3,536,604
HYDROCARBON CONVERSION PROCESS
Joseph Jaffe, Berkeley, Calif., assignor to Chevron Research Company, San Francisco, Calif., a corporation of Delaware
Continuation-in-part of application Ser. No. 749,836, Aug. 2, 1968. This application Sept. 6, 1968, Ser. No. 757,886
The portion of the term of the patent subsequent to Oct. 20, 1987, has been disclaimed
Int. Cl. C10g 13/04
U.S. Cl. 708—59                                5 Claims

ABSTRACT OF THE DISCLOSURE

A hydrocarbon conversion process which comprises hydrofining a hydrocarbon feedstock containing 300 to 10,000 p.p.m. N to reduce the nitrogen content thereof to from 10 to 200 p.p.m. N, and hydrocracking the resulting hydrofined feedstock in the presence of hydrogen and a catalyst comprising a crystalline zeolitic molecular sieve component substantially free of any catalytic metal or metals, a silica-containing gel component, a Group VI hydrogenating component, and a Group VIII hydrogenating component.

RELATED APPLICATION

This application is a continuation-in-part of Joseph Jaffe application Ser. No. 749,836, now abandoned, filed Aug. 2, 1968, for "Hydrotreating Catalyst and Process."

INTRODUCTION

This invention relates to catalytic hydrocracking of petroleum distillates and solvent-deasphalted residua to produce high-value fuel products, including gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pats. 3,140,251 and 3,140,253; British Pat. 1,056,301; and French Pats. 1,503,063 and 1,506,793.

The catalyst described in the above-mentioned copending Jaffe patent application Ser. No. 749,836, comprising a crystalline zeolitic molecular sieve component substantially free of any catalytic metal or metals, is an improvement in catalysts comprising crystalline zeolitic molecular sieves in cogel matrices.

OBJECTS

It is an object of the present invention to provide a hydrocracking process using said improved catalyst described in said prior Jaffe application that is capable of producing excellent-quality gasoline and other valuable fuel products, and to provide methods of operating the hydrocracking process in an integrated manner with other process units to achieve various advantageous results.

The present invention will best be understood, and further objects and advantages thereof will be apparent, from the following description when read in connection with the accompanying drawing.

DRAWING

The drawing is a diagrammatic illustration of apparatus and flow paths suitable for carrying out the process of several of the embodiments of the present invention, including embodiments wherein a selected fraction from the hydrocracking zone is catalytically reformed.

STATEMENT OF INVENTION

In accordance with the present invention there is provided a hydrocarbon conversion process which comprises hydrofining in a first reaction zone a hydrocarbon feedstock selected from the group consisting of petroleum distillates, solvent-deasphalted petroleum residua, shale oils and coal tar distillates, said feedstock containing substantial amounts of materials boiling above 200° F. and containing 300 to 10,000 p.p.m. organic nitrogen, said hydrofining being accomplished in said first reaction zone in the presence of at least 500 s.c.f. of hydrogen per barrel of said feedstock and in the presence of a hydrofining catalyst, at a temperature in the range 400° to 900° F., a pressure in the range 800 to 3500 p.s.i.g. and a liquid hourly space velocity in the range 0.1 to 5.0, said hydrofining being accomplished to the extent that the organic nitrogen content of said feedstock is reduced to from 10 to 200 p.p.m., and hydrocracking at least a substantial portion of the resulting hydrofined feedstock in a second reaction zone at a temperature in the range 400° to 950° F., a pressure in the range 800 to 3500 p.s.i.g., and a liquid hourly space velocity in the range 0.1 to 5.0, in the presence of 200 to 20,000 s.c.f. of hydrogen per barrel of hydrocarbon feedstock supplied to said second reaction zone, and in the presence of a catalyst composite comprising:

(A) a gel matrix comprising:
   (a) at least 15 weight percent silica,
   (b) alumina, in an amount providing an alumina-to-silica weight ratio of 15/85 to 80/20,
   (c) nickel or cobalt, or the combination thereof, in the form of metal, oxide, sulfide or any combination thereof, in an amount of 1 to 10 weight percent of said matrix, calculated as metal,
   (d) molybdenum or tungsten, or the combination thereof, in the form of metal, oxide, sulfide or any combination thereof, in an amount of 5 to 25 weight percent of said matrix, calculated as metal;
(B) a crystalline zeolitic molecular sieve substantially in the ammonia or hydrogen form, substantially free of any catalytic loading metal or metals, said sieve further being in particulate form and being dispersed through said matrix;

said catalyst composite being further characterized by an average pore diameter below 100 angstroms and a surface area above 200 square meters per gram.

Said gel matrix advantageously may further comprise titanium, zirconium, thorium or hafnium or any combination thereof in the form of metal, oxide, sulfide or any combination thereof, in an amount of 1 to 10 weight percent of said matrix, calculated as metal.

The reference herein to a crystalline zeolitic molecular sieve "substantially free of any catalytic loading metal or metals" means that the molecular sieve components contains no more than 0.5 weight percent Group VI and Group VIII metals, based on the molecular sieve component.

Said molecular sieve may be present in an amount of 1 to 50 weight percent, based on said catalyst.

The hydrocracking zone of the process of the present invention may be operated once through, or advantageously may be operated by recycling thereto materials from the effluent thereof that boil above 400° F., or, if desired, above 550° F. At least a portion of the materials boiling below 400° F. that are separated from the effluent from the hydrocracking zone advantageously may be catalytically reformed.

HYDROCARBON FEEDSTOCKS

The feedstocks supplied to the hydrocarcking zone containing a catalyst comprising a crystalline zeolitic molecular sieve component in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy staright-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocarcking zone containing the catalyst comprising a crystalline zeollitic molecular sieve.

NITROGEN CONTENT OF FEEDSTOCK

The feedstocks processed in the first reaction zone in the process of the present invention generally will contain 300 to 10,000 p.p.m. organic nitrogen. The hydrofining accomplished in the first reaction zone will reduce this nitrogen content to from 10 to 200 p.p.m. organic nitrogen. The hydrofining preferably will reduce the nitrogen content at least 50 percent. In general, the hydrocarbon feeds having a nitrogen content toward the lower end of the 300–10,000 p.p.m. nitrogen range will be hydrofined to a nitrogen level toward the lower end of the 10–200 p.p.m. nitrogen level, and vice versa. The hydrofining step advantageously may also accomplish hydrogenation and a reasonable amount of hydrocarcking.

SULFUR CONTENT OF FEEDSTOCKS

While the process of the present invention can be practiced with utility when supplying to the hydrocracking zone containing a catalyst comprising a molecular sieve component, hydrocarbon feeds containing relatively large quantities of organic sulfur, it is preferable to maintain the organic sulfur content of the feed to that zone in a range of 0 to 3 weight percent, preferably 0 to 1 weight percent.

FIRST STAGE HYDROFINING CATALYST

(A) General

The first stage hydrofining catalyst comprises a hydrogenating component selected from Group VI metals and compounds thereof, a hydrogenating component selected from Group VIII metals and compounds thereof, and a support selected from the group consisting of alumina and silica-alumina.

The hydrofining catalyst preferably has both hydrofining activity and hydrogenation activity, and even more preferably also has enough hydrocracking activity to covnert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia, and hydrogen sulfide.

Preferably, said hydrofining catalyst contains nickel or cobalt or compounds thereof in an amount of 1 to 15 weight percent, calculated as metal, and molybdenum or tungsten or compounds thereof in an amount of 5 to 30 weight percent, calculated as metal, with the remainder of the catalyst consisting of alumina, or silica-alumina containing up to 50 weight percent silica.

Particularly preferred examples of said hydrofining catalyst, comprising silica-alumina, are:

| | Percent by weight of total catalyst, calculated as metal | | | $SiO_2/Al_2O_3$ weight ratio |
|---|---|---|---|---|
| | Ni | Mo | W | |
| 1 | 4–10 | 15–25 | | 10/90–30/70 |
| 2 | 6–15 | | 15–30 | 30/70–50/50 |

It has been found that use of said hydrofining catalyst, particularly when it has substantial hydrogenation activity, increases the gasoline yield from the hydrocracking stage containing a catalyst comprising a molecular sieve component, compared with the gasoline yield from the hydrocracking stage when the identical feed thereto has not previously been processed in the presence of said hydrofining catalyst. The increased gasoline yield probably is related to the hydrogenation, in that more saturated hydrocarbon structures tend to crack more easily.

The hydrocracking catalyst comprising a molecular sieve component has activity and stability advantages over a conventional hydrocracking catalyst. It has been found that use of said hydrofining catalyst in the above-described arrangements further increases the activity and stability of the hydrocracking catalyst containing a molecular sieve component, compared with the activity and stability of the latter catalyst when the identical feed thereto has not previously been processed in the presence of said hydrofining catalyst to reduce the nitrogen content of the feedstock to form 10 to 200 parts per million.

(B) Method of preparation

Said hydrofining catalyst may be prepared by any conventional preparation method, including impregnation of an alumina or silica-alumina support with salts of the desired hydrogenating component, or cogelation of all components, with the latter method being preferred.

SECOND STAGE CATALYST COMPRISING A CRYSTALLINE ZEOLITIC MOLECULAR SIEVE COMPONENT AND PREPARATION THEREOF

(A) General

The second stage catalyst is an effective hydrocracking catalyst. The crystalline zeolitic molecular sieve component of the catalyst may be of any type that is known in the art as a useful component of a conventional hydrocracking catalyst containing a crystalline zeolitic molecular sieve component. A decationized molecular sieve cracking component is preferred. Especially suitable are faujasite, particularly "Y" type and "X" type faujasite, and mordenite, in the ammonia or hydrogen form.

(B) Method of preparation

The molecular sieve component of the catalyst may be prepared by any conventional method known in the art.

The molecular sieve component may be dispersed in a matrix of the other catalyst components by cogelation of said other components around said molecular sieve component in a conventional manner.

The molecular sieve component, substantially in the ammonia or hydrogen form, may be maintained substantially free of any catalytic loading metal or metals, as required by the present invention, by dispersing the molecular sieve component in a slurry of the precursors of the other catalyst components at a pH of 5 or above. When a sodium form of molecular sieve component is one of the starting materials, it may be converted to the ammonia or hydrogen form by ion exchange prior to being combined with the other catalyst components. Alternatively, it may be combined with the other catalyst components and then converted to the ammonia or hydrogen form by ion exchange. In either case, the molecular sieve component should not be combined with the precursors of the other catalyst components at a pH below 5.

The catalyst, in hydrogen form, is dried in a conventional manner, and then desirably is activated in an oxygen-containing gas stream for 1 to 10 hours at 900° to 1600° F., preferably 2 to 8 hours at 1200° to 1500° F.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrocracking zone containing the catalyst comprising a molecular sieve component is operated at hydrocracking conditions including a temperature in the range 400° to 950° F., preferably 500 to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f. of hydrogen per barrel of said feedstock.

The operating conditions for the hydrofining zone, which also may accomplish hydrogenation and some hydrocracking, include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

The operating conditions in the reforming zone and catalytic cracking zone employed in various embodiments of the present invention are conventional conditions known in the art.

PROCESS OPERATION WITH REFERENCE TO DRAWING

Referring now to the drawing, in accordance with a primary embodiment of the present invention, a hydrocarbon feedstock as previously described, which in this case may boil above 400° F. and which contains from 10 to 200 p.p.m. organic nitrogen, is passed through line 1 into hydrocracking zone 2, which contains a hydrocracking catalyst comprising a molecular sieve component substantially free of any catalytic loading metal, dispersed in a gel matrix comprising a silica-alumina gel, a Group VIII hydrogenation component, and a Group VI hydrogenation component. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are sepaarted into fractions, including a $C_4^-$ fraction which is withdrawn through line 10, a $C_5$-180° F. fraction which is withdrawn through line 11, and a 180°–400° F. fraction which is withdrawn through line 12.

In accordance with another embodiment of the present invention, the 180°–400° F. fraction in line 12 is reformed under conventional catalytic reforming conditions in reforming zone 13, from which a catalytic reformate is withdrawn through line 14.

In accordance with a further embodiment of the present invention, a hydrocarbon feedstock containing 200 to 10,000 p.p.m. organic nitrogen which is to be hydrofined and also hydrogenated and/or partially hydrocracked, if desired, in a separate hydrotreating zone prior to being hydrocracked in hydrocracking zone 2, is passed through line 15 to hydrotreating zone 16 containing a catalyst, as previously described, having hydrofining activity and desirably also having substantial hydrogenation activity. The feedstock is hydrotreated in zone 16 at conditions previously described, in the presence of hydrogen supplied through line 17, and thereby the organic nitrogen content thereof is reduced to from 10 to 200 parts per million. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22.

EXAMPLES

The following examples are given for the purpose of further illustrating the practice of the process of the present invention. However, it is to be understood that these examples are given by way of exemplification only, and are not intended in any way to limit the scope of the present invention.

Example 1

A cogelled catalyst (Catalyst A) of the following composition was prepared.

| Component: | Wt. percent of total catalyst |
|---|---|
| NiO | 9.2 |
| $WO_3$ | 22.7 |
| $TiO_2$ | 7.2 |
| $Al_2O_3$ | 27.0 |
| $SiO_2$ | 23.9 |
| Crystalline zeolitic molecular sieve, sodium "Y" form | 10.0 |
| Total | 100.00 |

The catalyst was prepared by the following steps, using sufficient quantities of the various starting materials to produce the above-indicated weight percentages of the components of the final catalyst:

(1) An aqueous acidic solution was prepared, containing $AlCl_3$, $TiCl_4$, $NiCl_2$ and acetic acid.

(2) Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components would occur at a neutral pH of about 7.

(3) The acidic and alkaline solutions were combined, and coprecipitation of all of the metal-containing components occured at a pH of about 7, resulting in a slurry.

(4) Linde sodium "Y" crystalline zeolitic molecular sieve in finely divided form was added to the slurry.

(5) The molecular-sieve containing slurry was filtered to produce a molecular sieve-containing hydrogel filter cake, which was washed repeatedly with dilute ammonium acetate solution, to remove sodium and chloride ionic impurities from both the hydrogel and the molecular sieve contained therein.

(6) The molecular sieve-containing hydrogel was dried in an air-circulating oven and then was activated in flowing air for approximately 5 hours at 950° F.

The finished catalyst was characterized by a surface area of 384 m.²/g., a pore volume of 0.4 cc./g., an average pore diameter of 42 angstroms, and a molecular sieve component substantially free of catalytic metals; that is, substantially all of the nickel, tungsten and titanium in the catalyst was located in the gel portion of the catalyst rather than in the molecular sieve component thereof.

Example 2

A portion of Catalyst A of Example 1 is used to hydrocrack a solvent-deasphalted hydrocarbon oil boiling above 550° F. and containing 6000 parts per million organic nitrogen, with extinction recycle to the hydrocracking zone of products boiling above 550° F. That is, the hydrocracking process is operated to produce as liquid products gasoline and jet fuel boiling range materials, with recycle to extinction of higher boiling materials.

The hydrocracking conditions, after operating equilibrium is reached, are:

| | |
|---|---|
| Temperature, ° F. | 785 |
| Total pressure, p.s.i.g. | 2,500 |
| Total exit gas rate, s.c.f./bbl. | 10,000 |
| Liquid hourly space velocity, v./v./hr. | 1.2 |
| Conversion to 550° F.⁻, vol. percent | 50 |

Example 3

Another portion of Catalyst A of Example 1 is used to hydrocrack another portion of the same hydrocarbon oil described in Example 2, which, however, first is hydrofined in the presence of a conventional hydrofining catalyst under conventional hydrofining conditions to reduce the organic nitrogen content of the oil to 100 parts per million. The hydrocracking is accomplished with extinction recycle to the hydrocracking zone of porducts boiling above 550° F.

The hydrocracking conditions, after operating equilibrium is reached, are:

| | |
|---|---|
| Temperature ° F. | 700 |
| Total pressure, p.s.i.g. | 2,500 |
| Total exit gas rate, s.f.c./bbl. | 10,000 |
| Liquid hourly space velocity, v./v./hr. | 2.0 |
| Conversion to 550° F.⁻, vol. percent | 50 |

From this example it may be seen that the same 50 volume percent conversion to 550° F.⁻ products is obtainable at an operating temperature 85° F. lower than the operating temperature in Example 2, because the organic nitrogen content of the hydrocarbon oil has been reduced in a hydrofining step prior to subjecting the oil to hydrocracking. From this example also it may be seen that the organic nitrogen content reduction of the hydrocarbon oil in the prior hydrofining step enables the indicated percent conversion to be obtained in the hydrocracking step at a substantially higher space velocity than is necessary in Example 2; that is, the indicated results are obtainable at a higher feed throughput rate.

Example 4

The 180° F.–400° F. portion of the product of Example 3 is catalytically reformed, using a conventional reforming catalyst and conventional reforming conditions, and is found to be a superior feedstock for this operation.

Although only specific embodiments of the present invention have been described, numerous variations can be made in these embodiments without departing from the spirit of the invention, and all such variations that fall within the scope of the appended claims are intended to be embraced thereby.

What is claimed is:

1. A hydrocarbon conversion process which comprises hydrofining in a first reaction zone of hydrocarbon feedstock selected from the group consisting of petroleum distillates, solvent-deasphalted petroleum residua, shale oils and coal tar distillates, said feedstock containing substantial amounts of materials boiling about 200° F. and containing 300 to 10,000 parts per million organic nitrogen, said hydrofining being accomplished in said first reaction zone in the presence of at least 500 s.c.f. of hydrogen per barrel of said feedstock and in the presence of a hydrofining catalyst, at a temperature in the range 400° to 900° F., a pressure in the range 800 to 3500 p.s.i.g., and a liquid hourly space velocity in the range 0.1 to 5.0, said hydrofining being accomplished to the extent that the organic nitrogen content of said feedstock is reduced to from 10 to 200 parts per million, and hydrocracking at least a substantial portion of the resulting hydrofined feedstock in a second reaction zone at a temperature in the range 400° to 950° F., a pressure in the range of 800 to 3500 p.s.i.g., and a liquid hourly space velocity in the range 0.1 to 5.0, in the presence of 200 to 20,000 s.c.f. of hydrogen per barrel of hydrocarbon feedstock supplied to said second reaction zone, and in the presence of a catalyst composite comprising:

(A) a gel matrix comprising:
 (a) at least 15 weight percent silica,
 (b) alumina, in an amount providing an alumino-to-silica weight ratio of 15/85 to 80/20,
 (c) nickel or cobalt, or the combination thereof, in the form of metal, oxide, sulfide or any combination thereof, in an amount of 1 to 10 weight percent of said matrix, calculated as metal,
 (d) molybdenum or tungsten, or the combination thereof, in the form of metal, oxide, sulfide or any combination thereof, in an amount of 5 to 25 weight percent of said matrix, calculated as metal;
(B) a crystalline zeolitic molecular sieve substantially in the ammonia or hydrogen form, substantially free of any loading metal or metals, said sieve further being in particulate form and being dispersed through said matrix;

said catalyist composite being further characterized by an average pore diameter below 100 angstroms and a surface area above 200 square meters per gram.

2. A process as in claim 1, wherein said gel matrix further comprises titanium, zirconium, thorium or hafnium or any combination thereof, in the form of metal, oxide, sulfide or any combination thereof, in an amount of 1 to 10 weight percent of said matrix, calculated as metal.

3. A process as in claim 1, wherein materials boiling above 400° F. are separated from the effluent from said second reaction zone and are recycled to said second reaction zone.

4. A process as in claim 3, wherein said recycled materials boil above 550° F.

5. A process as in claim 1, wherein materials boiling below 400° F. are separated from the effluent from said second reaction zone and at least a portion of said separated materials are catalytically reformed.

References Cited

UNITED STATES PATENTS

| | | | |
|---|---|---|---|
| 3,132,087 | 5/1964 | Kelley et al. | 208—60 |
| 3,140,253 | 7/1964 | Plank et al. | 208—120 |

DELBERT E. GANTZ, Primary Examiner

A. RIMENS, Assistant Examiner

U.S. Cl. X.R.

208—60, 89, 111; 252—455

PO-1050
(5/69)

UNITED STATES PATENT OFFICE
CERTIFICATE OF CORRECTION

Patent No. 3,536,604            Dated    October 27, 1970

Inventor(s)   JOSEPH JAFFE

It is certified that error appears in the above-identified patent and that said Letters Patent are hereby corrected as shown below:

Col. 1, line 11, "U.S. Cl. 708-59" should read --U.S. Cl. 208-59--

Col. 5, line 1, "hydrogen" should read --hydrogel--.

Col. 7, line 60, "of" should read --a--.

SIGNED AND
SEALED

FEB 23 1971

(SEAL)
Attest:

Edward M. Fletcher, Jr.
Attesting Officer

WILLIAM E. SCHUYLER, JR.
Commissioner of Patents